United States Patent
Millar et al.

(10) Patent No.: US 10,905,058 B2
(45) Date of Patent: Feb. 2, 2021

(54) DEVICES, SYSTEMS, AND METHODS FOR PROVIDING AND USING A PUMP CONTROL MODULE IN A MASTER CONTROLLER IN AN ASSEMBLY LINE GROW POD

(71) Applicant: Grow Solutions Tech LLC, Lehi, UT (US)

(72) Inventors: Gary Bret Millar, Highland, UT (US); Kevin Hurst, Pleasant Grove, UT (US)

(73) Assignee: GROW SOLUTIONS TECH LLC, Vineyard, UT (US)

( * ) Notice: Subject to any disclaimer, the term of this patent is extended or adjusted under 35 U.S.C. 154(b) by 320 days.

(21) Appl. No.: 15/965,163

(22) Filed: Apr. 27, 2018

(65) Prior Publication Data
US 2018/0359964 A1    Dec. 20, 2018

Related U.S. Application Data

(60) Provisional application No. 62/519,428, filed on Jun. 14, 2017, provisional application No. 62/519,430, (Continued)

(51) Int. Cl.
*A01G 27/00* (2006.01)
*F04B 41/06* (2006.01)
(Continued)

(52) U.S. Cl.
CPC .......... *A01G 27/003* (2013.01); *A01G 7/045* (2013.01); *A01G 27/001* (2013.01);
(Continued)

(58) Field of Classification Search
CPC .... A01G 27/003; A01G 25/16; A01G 25/167; A01G 7/045; A01G 9/26; A01G 9/249
See application file for complete search history.

(56) References Cited

U.S. PATENT DOCUMENTS

| 5,184,420 A | 2/1993 | Papadopoulos et al. |
| 5,262,936 A | 11/1993 | Faris et al. |
| (Continued) | | |

FOREIGN PATENT DOCUMENTS

| WO | 2013066254 A1 | 5/2013 |
| WO | 2016147195 A1 | 9/2016 |

OTHER PUBLICATIONS

International Search Report pertaining to International Application No. PCT/US2018/031760 dated Sep. 7, 2018.

*Primary Examiner* — Magdalena Topolski
*Assistant Examiner* — Katelyn T Truong
(74) *Attorney, Agent, or Firm* — Dinsmore & Shohl LLP

(57) ABSTRACT

Devices, systems, and methods for providing and operating a pump control module and one or more pumps in an assembly line grow pod are provided herein. Some embodiments include the assembly line grow pod having one or more pumps, a master controller with a plurality of bays and being communicatively coupled to the pumps, and a pump control module within one of the bays such that the pump control module is communicatively coupled to the master controller and the pumps. The pump control module is programmed to receive information regarding fluid within the assembly line grow pod, determine one or more control signals necessary to provide or pressurize the fluid, and provide the one or more control signals to the one or more pumps.

20 Claims, 10 Drawing Sheets

Related U.S. Application Data filed on Jun. 14, 2017, provisional application No. 62/519,419, filed on Jun. 14, 2017.

(51) Int. Cl.
*A01G 31/04* (2006.01)
*F04B 23/04* (2006.01)
*F04B 49/06* (2006.01)
*A01G 7/04* (2006.01)
*A01G 9/24* (2006.01)

(52) U.S. Cl.
CPC ............ *A01G 31/042* (2013.01); *F04B 23/04* (2013.01); *F04B 41/06* (2013.01); *F04B 49/065* (2013.01); *A01G 9/247* (2013.01); *F04B 2205/05* (2013.01); *F04B 2205/09* (2013.01)

(56) References Cited

U.S. PATENT DOCUMENTS

| | | |
|---|---|---|
| 7,328,089 B2 | 2/2008 | Curren |
| 7,772,726 B1 | 8/2010 | Porter et al. |
| 7,916,458 B2 | 3/2011 | Nelson et al. |
| 8,204,630 B2 | 6/2012 | Wilson |
| 9,516,822 B2 | 12/2016 | Gonyer et al. |
| 9,538,713 B2 | 1/2017 | Pearson et al. |
| 9,547,313 B2 | 1/2017 | Nickerson et al. |
| 9,603,316 B1 | 3/2017 | Mansey et al. |
| 10,094,116 B2 * | 10/2018 | Mawendra ............ A01G 31/042 |
| 2002/0088173 A1 * | 7/2002 | Hessel .................. A01C 11/02 47/60 |
| 2009/0025287 A1 | 1/2009 | Lee |
| 2014/0108692 A1 * | 4/2014 | Doglio ................... G06F 1/183 710/300 |
| 2014/0115958 A1 | 5/2014 | Helene et al. |
| 2018/0014486 A1 * | 1/2018 | Creechley ............. A01G 7/045 |
| 2019/0000019 A1 * | 1/2019 | Alexander ............. B25J 11/00 |

* cited by examiner

DEVICES, SYSTEMS, AND METHODS FOR PROVIDING AND USING A PUMP CONTROL MODULE IN A MASTER CONTROLLER IN AN ASSEMBLY LINE GROW POD

CROSS REFERENCE TO RELATED APPLICATION

This application claims the benefit of U.S. Provisional Application Ser. No. 62/519,428, filed on Jun. 14, 2017; U.S. Provisional Application Ser. No. 62/519,430, filed on Jun. 14, 2017; and U.S. Provisional Application Ser. No. 62/519,419, filed on Jun. 14, 2017, which are incorporated by reference in their respective entireties.

TECHNICAL FIELD

Embodiments described herein generally relate to systems and methods for controlling one or more components of an assembly line grow pod and, more specifically, to use of a pump control module in a modular control interface to control pumps in an assembly line grow pod.

BACKGROUND

Industrial grow pods that are used to continuously grow crops may utilize an assembly line of carts that continuously traverse a track as plant seeds are planted, grown, and harvested, and then continue to traverse the track as the carts (and/or trays thereon) are cleaned and washed to repeat the process. To ensure smooth operation of the industrial grow pod, it may be desirable to ensure that control modules in the industrial grow pod are continuously receiving information and data from various components of the grow pod and continuously provide instructions to various components accordingly, even in instances where certain control modules may be removed for repair, reprogramming, redeployment, and/or the like. Some control modules may be particularly adapted to control certain devices in the industrial grow pod.

SUMMARY

Devices, systems, and methods for providing and using a pump control module are disclosed. One embodiment includes an assembly line grow pod having one or more pumps, a master controller comprising a plurality of bays, the master controller communicatively coupled to the one or more pumps, and a pump control module received within a first bay of the plurality of bays of the master controller such that the pump control module is communicatively coupled to the master controller and the one or more pumps. The pump control module is programmed to receive information regarding fluid within the assembly line grow pod, determine one or more control signals necessary to provide or pressurize the fluid, and provide the one or more control signals to the one or more pumps.

In another embodiment, a master controller in an assembly line grow pod includes a plurality of bays, each one of the plurality of bays having a bay I/O port that is communicatively coupled to one or more pumps in the assembly line grow pod and a pump control module received within a first bay of the plurality of bays of the master controller. The pump control module includes an I/O port communicatively coupled to the bay I/O port, a processing device, and a non-transitory, processor-readable storage medium having one or more programming instructions stored thereon. The one or more programming instructions, when executed, cause the processing device to receive an input, determine an action to be completed based on the input, where the action comprises operation of the one or more pumps in the assembly line grow pod, and transmit an instruction to the one or more pumps, the instruction directing the operation of the one or more pumps.

In yet another embodiment, a pump control module includes a processing device and a non-transitory, processor-readable storage medium having one or more programming instructions stored thereon. The programming instructions, when executed, cause the processing device to receive an input, determine an action to be completed based on the input, where the action comprises operation of one or more pumps in an assembly line grow pod, the one or more pumps communicatively coupled to the pump control module, and transmit an instruction to the one or more pumps, the instruction directing the operation of the one or more pumps in the assembly line grow pod.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include devices, systems, and methods for providing and operating a pump control module in a modular control interface of a master controller that controls various fluid pump components of an assembly line grow pod. The assembly line grow pod may be configured with an assembly line of trays holding seeds and/or plants that follow a track. The assembly line grow pod may further include various components that provide water, nutrients, ambient air conditions, and/or the like to ensure optimum growth of the seeds and/or plants as the trays traverse the track. Such components may include fluid pumps that pump the water, nutrients, ambient air conditions, and/or the like to various areas of the assembly line grow pod. These components of the assembly line grow pod are controlled by a master controller.

Specific control of such components may be performed by one or more hot-swappable modules e.g., a hot swappable pump control module) that are inserted in a modular control interface of the master controller. In order for the various modules to be hot swappable, the devices, systems and methods described herein are utilized to ensure uninterrupted functioning of the assembly line grow pod when particular modules are removed from the modular control interface of the master controller. As such, the devices, systems, and methods described herein provide functionality to control at least a portion of the pumps in the assembly line grow pod to ensure that the assembly line grow pod continues to function as particular modules are swapped out. The devices, systems, and methods for providing and using a pump control module in an assembly line grow pod, as well as an assembly line grow pod incorporating the same will be described in more detail below.

Figure 1A:
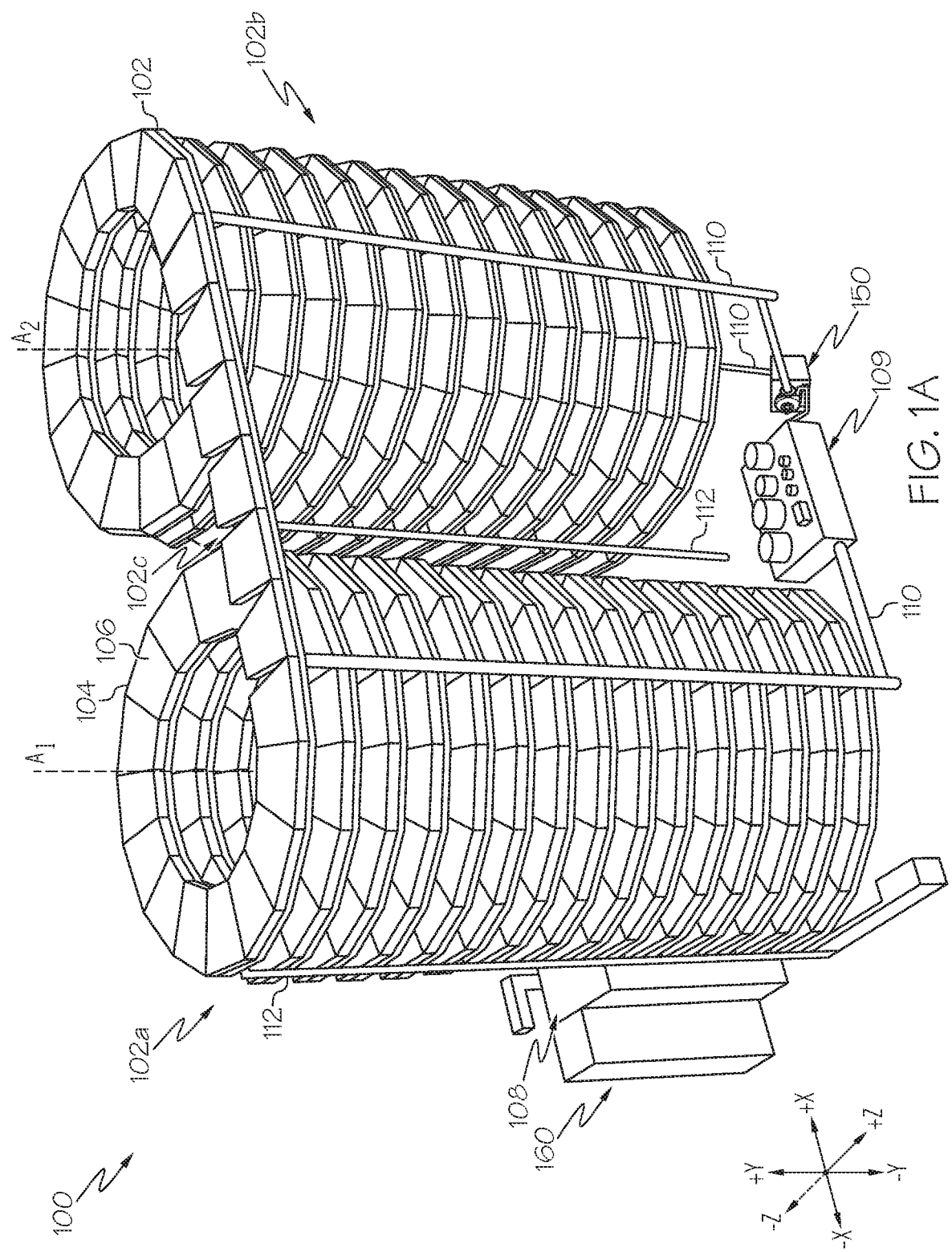
FIG. 1A schematically depicts a front perspective view of an illustrative assembly line grow pod having a master controller according to one or more embodiments shown and described herein.
Figure 1B:
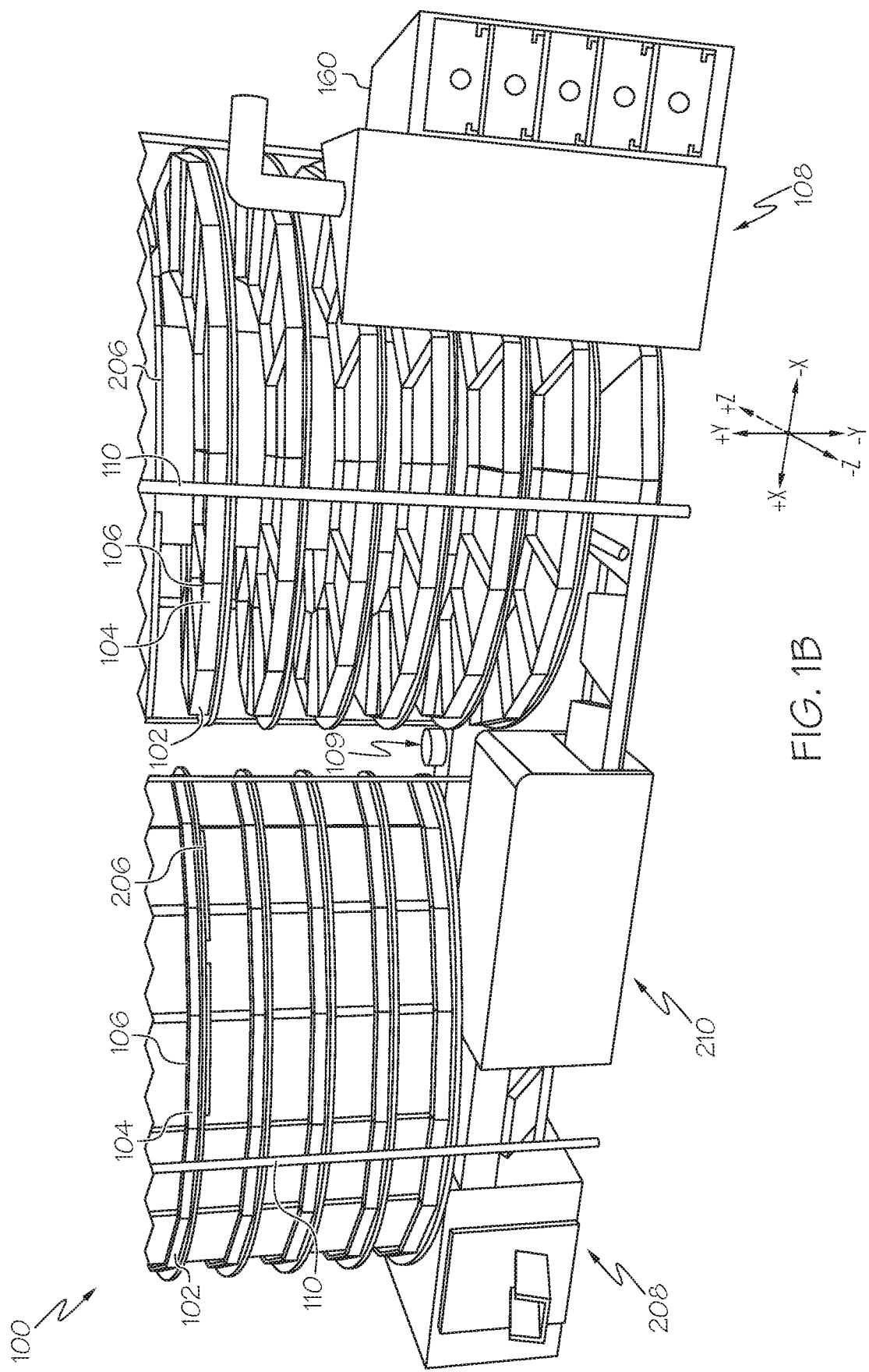
FIG. 1B schematically depicts a rear perspective view of a portion of an illustrative assembly line grow pod having a master controller according to one or more embodiments shown and described herein.

An illustrative industrial grow pod that allows for the continuous, uninterrupted growing of crops is depicted herein. Particularly, FIG. 1A depicts a front perspective view of an illustrative assembly line grow pod 100 having a master controller according to one or more embodiments shown and described herein. In addition, FIG. 1B depicts a rear perspective view of a portion of the assembly line grow pod 100. As illustrated in FIGS. 1A and 1B, the assembly line grow pod 100 may include a track 102 that holds one or more carts 104. Referring particularly to FIG. 1A, the track 102 may include at least an ascending portion 102a, a descending portion 102b, and a connection portion 102c. The track 102 may wrap around (e.g., in a counterclockwise direction, as shown in FIG. 1A) a first axis $A_1$ such that the carts 104 ascend upward in a vertical direction (e.g., in the +y direction of the coordinate axes of FIG. 1A). The connection portion 102c may be relatively level (although this is not a requirement) and is utilized to transfer carts 104 to the descending portion 102b. The descending portion 102b may be wrapped around a second axis $A_2$ (e.g., in a counterclockwise direction, as shown in FIG. 1A) that is substantially parallel to the first axis $A_1$, such that the carts 104 may be returned closer to a ground level.

It should be understood that while the embodiment of FIGS. 1A and 1B depict an assembly line grow pod 100 that wraps around a plurality of axes $A_1$, $A_2$, this is merely one example. Any configuration of assembly line or stationary grow pod may be utilized for performing the functionality described herein.

Referring to FIG. 1A, supported on each one of the carts 104 is a tray 106. The tray 106 may generally contain one or more components for holding seeds as the seeds germinate and grow into plants as the cart 104 traverses the ascending portion 102a, the descending portion 102b, and the connection portion 102c of the track 102 of the assembly line grow pod 100. The seeds may be planted, allowed to grow, and then may be harvested by various components of the assembly line grow pod 100, as described in greater detail herein. In addition, the seeds (and thereafter the shoots and plants) within the trays 106 may be monitored, provided with water, nutrients, environmental conditions, light, and/or the like to facilitate growing.

Also depicted in FIGS. 1A and 1B is a master controller 160. The master controller 160 may include, among other things, control hardware for controlling various components of the assembly line grow pod 100, as described in greater detail herein. The master controller 160 may be arranged as a modular control interface that receives a plurality of hot-swappable control modules, as described in greater detail herein. One module in the master controller 160, which may be fixed or hot-swappable, may be the pump control module, as described in greater detail herein.

Coupled to the master controller 160 is a seeder component 108. The seeder component 108 may be configured to place seeds in the trays 106 supported on the one or more carts 104 as the carts 104 pass the seeder component 108 in the assembly line. Depending on the particular embodiment, each cart 104 may include a single section tray 106 for receiving a plurality of seeds. Some embodiments may include a multiple section tray 106 for receiving individual seeds in each section (or cell). In the embodiments with a single section tray 106, the seeder component 108 may detect presence of the respective cart 104 and may begin laying seed across an area of the single section tray 106. The seed may be laid out according to a desired depth of seed, a desired number of seeds, a desired surface area of seeds, and/or according to other criteria. In some embodiments, the seeds may be pre-treated with nutrients and/or anti-buoyancy agents (such as water) as these embodiments may not utilize soil to grow the seeds and thus might need to be submerged.

In the embodiments where a multiple section tray 106 is utilized with one or more of the carts 104, the seeder component 108 may be configured to individually insert seeds into one or more of the sections of the tray 106. Again, the seeds may be distributed on the tray 106 (or into individual cells) according to a desired number of seeds, a desired area the seeds should cover, a desired depth of seeds, etc.

Referring to FIG. 1A, the assembly line grow pod 100 may also include a watering component 109 coupled to one or more water lines 110 via one or more pumps 150 in some embodiments. While only a single pump 150 is depicted in FIG. 1A, it should be understood that the assembly line grow pod 100 may incorporate a plurality of pumps 150 in some embodiments. The watering component 109, the one or more pumps 150, and the one or more water lines 110 may distribute water and/or nutrients to one or more trays 106 at particular areas of the assembly line grow pod 100.

For example, the one or more water lines 110 may extend between the watering component 109 and one or more watering stations arranged at particular locations within the assembly line grow pod 100 such that the pumps 150 connected in line with the water lines 110 pump water and/or nutrients to the one or more watering stations. As a cart 104 passes a watering station, a particular amount of water may be provided to the tray 106 supported by the cart 104. For example, seeds may be sprayed at a watering station to reduce buoyancy and then flooded. Additionally, water usage and consumption may be monitored at a watering station and data may be generated that corresponds to such water usage and consumption. As such, when the cart 104 reaches a subsequent watering station along the track 102 in the assembly line grow pod 100, the data may be utilized to determine an amount of water to supply to the tray 106 at that time.

In addition, the watering component 109 is communicatively coupled to the master controller 160 (particularly a pump control module therein, as described in greater detail herein) such that the master controller 160 provides control signals to the watering component 109 and/or receives status signals from the watering component 109. As a result of this providing and receiving of signals, the master controller 160 can effectively direct the watering component 109 to provide fluid via one or more water lines 110 fluidly coupled to the watering component 109.

Also depicted in FIG. 1A are airflow lines 112, which may also be connected to one or more air pumps (not shown in FIG. 1A). Specifically, the one or more air pumps may be pumps that are similar to pumps 150, but are coupled to the airflow lines 112 to deliver air to one or more portions of the assembly line grow pod 100. The air may be delivered, for example, to control a temperature of the assembly line grow pod 100 or an area thereof, a pressure of the air in the assembly line grow pod 100 or an area thereof, control a concentration of carbon dioxide ($CO_2$) in the air of the assembly line grow pod 100 or an area thereof, control a concentration of oxygen in the air of the assembly line grow pod 100 or an area thereof, control a concentration of nitrogen in the air of the assembly line grow pod 100 or an area thereof, and/or the like. Accordingly, the airflow lines 112 may distribute the airflow at particular areas in the assembly line grow pod 100 to facilitate control. As such, the airflow lines 112 may be fluidly coupled to a pump and may further be fluidly coupled between an air source and a target air delivery area. In addition, sensors may sense characteristics (e.g., a concentration, a pressure, a temperature, flow velocity, and/or the like) and may generate data and/or signals corresponding to the sensed characteristics, which may be used for further control.

Referring to FIG. 1B, additional components of the assembly line grow pod 100 are illustrated, including (but not limited to) one or more lighting devices 206, a harvester component 208, and a sanitizer component 210. As described above, the seeder component 108 may be configured to seed the trays 106 of the carts 104. Still referring to FIG. 1A, the lighting devices 206 may provide light waves that may facilitate plant growth at various locations throughout the assembly line grow pod 100 as the carts 104 traverse the track 102. Depending on the particular embodiment, the lighting devices 206 may be stationary and/or movable. As an example, some embodiments may alter the position of the lighting devices 206, based on the plant type, stage of development, recipe, and/or other factors.

Additionally, as the plants are lighted, watered, and provided nutrients, the carts 104 traverse the track 102 of the assembly line grow pod 100. Additionally, the assembly line grow pod 100 may detect a growth and/or fruit output of a plant and may determine when harvesting is warranted. If harvesting is warranted prior to the cart 104 reaching the harvester component 208, modifications to a recipe may be made for that particular cart 104 until the cart 104 reaches the harvester component 208. Conversely, if a cart 104 reaches the harvester component 208 and it has been determined that the plants in that cart 104 are not ready for harvesting, the assembly line grow pod 100 may commission that cart 104 for another lap. This additional lap may include a different dosing of light, water, nutrients, etc. and the speed of the cart 104 could change, based on the development of the plants on the cart 104. If it is determined that the plants on a cart 104 are ready for harvesting, the harvester component 208 may harvest the plants from the trays 106.

Referring to FIG. 1B, the harvester component 208 may cut the plants at a particular height for harvesting in some embodiments. In some embodiments, the tray 106 may be overturned to remove the plants from the tray 106 and into a processing container for chopping, mashing, juicing, and/or the like. Because many embodiments of the assembly line grow pod 100 do not use soil, minimal (or no) washing of the plants may be necessary prior to processing.

Similarly, some embodiments may be configured to automatically separate fruit from the plant, such as via shaking, combing, etc. If the remaining plant material may be reused to grow additional fruit, the cart 104 may keep the remaining plant and return to the growing portion of the assembly line. If the plant material is not to be reused to grow additional fruit, it may be discarded or processed, as appropriate.

Once the cart 104 and tray 106 are clear of plant material, the sanitizer component 210 may remove any particulate matter, plant material, and/or the like that may remain on the cart 104. As such, the sanitizer component 210 may implement any of a plurality of different washing mechanisms, such as high pressure water, high temperature water, and/or other solutions for cleaning the cart 104 and/or the tray 106. As such, the sanitizer component 210 may be fluidly coupled to one or more of the water lines 110 to receive water that is pumped via the one or more pumps 150 through the water lines.

In some embodiments, the tray 106 may be overturned to output the plant for processing and the tray 106 may remain in this position. As such, the sanitizer component 210 may receive the tray 106 in this position, which may wash the cart 104 and/or the tray 106 and return the tray 106 back to the growing position. Once the cart 104 and/or tray 106 are cleaned, the tray 106 may again pass the seeder component 108, which may determine that the tray 106 requires seeding and may begin the process placing seeds in the tray 106, as described herein.

It should be understood that the assembly line grow pod 100 may include additional components not specifically described herein, and the present disclosure is not limited solely to the components described herein. Illustrative additional components may include, but are not limited to, other watering components, other lighting components, other airflow components, growth monitoring components, other harvesting components, other washing and/or sanitizing components, and/or the like.

Control of the various components described hereinabove, as well as components of the assembly line grow pod 100 not specifically described herein, may be completed by a plurality of control modules within the master controller 160. Each control module within the master controller 160 may be particularly configured to control a single component, a plurality of components, portions of one or more components, and/or the like. For example, a pump control module may control one or more pumps that pump water, nutrients, ambient air, and/or the like, such as the one or more pumps 150.

In some embodiments, control of various components of the assembly line grow pod 100 may be managed by a plurality of control modules such that if a particular control module is removed from the master controller 160 (e.g., a pump control module), the remaining control modules within the master controller 160 can still control various functions of the assembly line grow pod 100 (e.g., pumping functions of the one or more pumps 150) so as to avoid an instance where the entire assembly line grow pod 100 (or a portion of the assembly line grow pod 100) has to be shut down while a control module is removed, replaced, repaired, or the like. To ensure that the assembly line grow pod 100 continues to run even as a particular control module is removed from the master controller 160, the master controller 160 may include a control module that acts as an intermediary module, sending and receiving signals from the various components of the assembly line grow pod 100 and relaying such signals between the appropriate control module(s) within the master controller 160. In some embodiments, the control module may include computer hardware and software components that utilize scripting language to translate recipes and other instructions that are received into binary signals that can be transmitted to the other control modules included within the master controller 160 (e.g., a pump control module). For example, if a determination is made that a particular tray 106 is to be watered by a watering device (e.g., a fluid distribution manifold) and that the tray 106 is passing in a particular period of time, the control module may determine what components (e.g., pumps) are needed, prepare binary signals, and relay the binary signals to the various other control modules that control watering at the time at which watering is necessary (e.g., a pump control module). Other particular details regarding the functionality of the various control modules are discussed herein.

While the present disclosure generally relates to a hot swappable or removably insertable control module and/or a hot swappable or removably insertable pump control module, the present disclosure is not restricted to such. In some embodiments, the control module and/or the pump control module may be fixed within the master controller 160 such that they are not removably insertable or hot swappable like the various other modules. As such, the control module and/or the pump control module may always be available to function within the master controller 160 as described herein.

Figure 2:
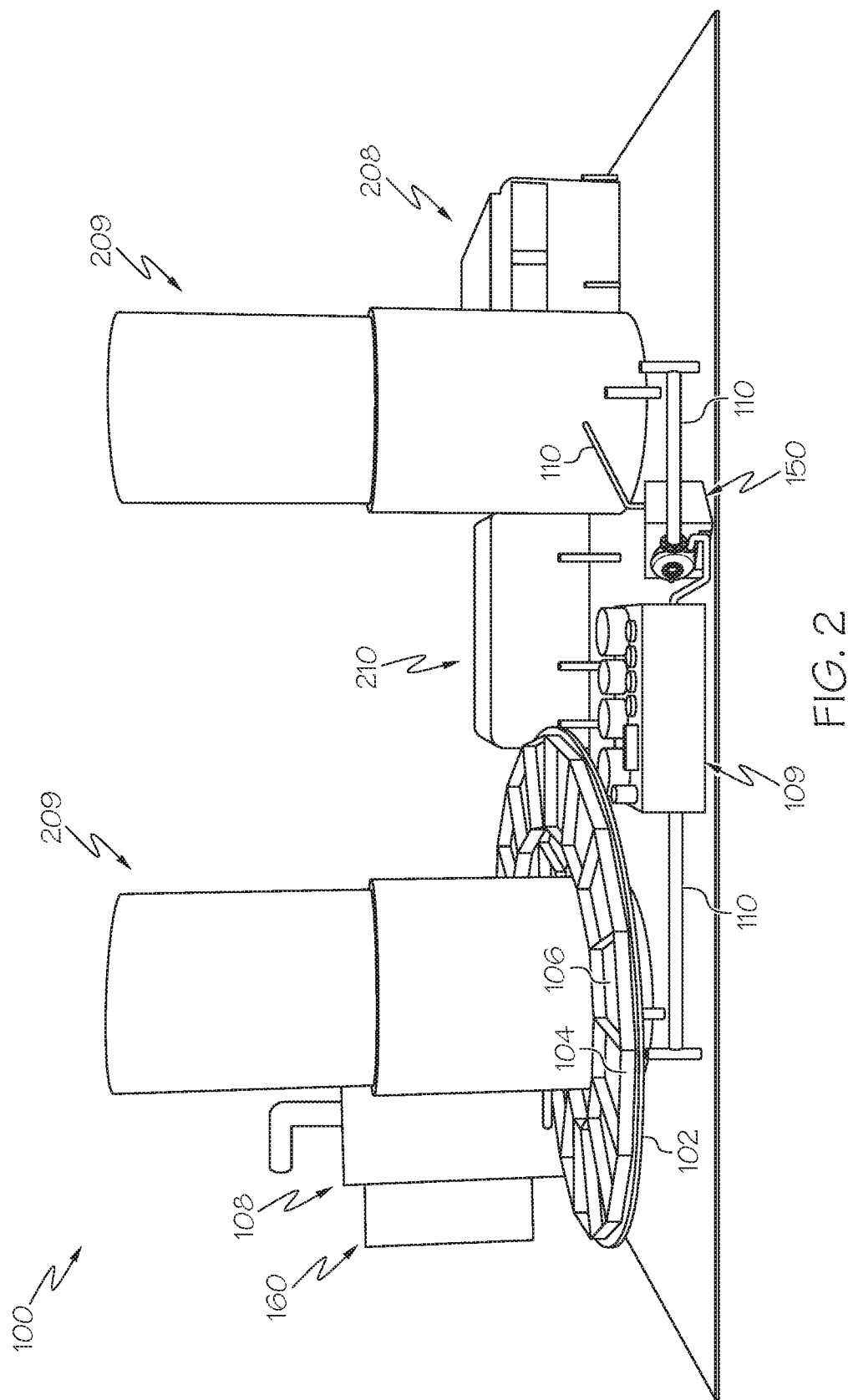
FIG. 2 schematically depicts a front perspective view of an illustrative assembly line grow pod having a master controller with portions of a track removed for purposes of illustrating additional components of the assembly line grow pod according to one or more embodiments shown and described herein.

In addition to the various components described hereinabove with respect to FIGS. 1A and 1B, the assembly line grow pod may further include additional components that are specifically related to storing fluid, moving fluid, distributing fluid, pressurizing fluid, combining fluids, and/or the like. For example, FIG. 2 schematically depicts a front perspective view of an illustrative assembly line grow pod having a master controller with portions of a track removed for purposes of illustrating additional components of the assembly line grow pod. More specifically, FIG. 2 depicts a plurality of fluid holding tanks 209. The fluid holding tanks 209 may generally be storage tanks that are adapted to hold various fluids, including water, water and nutrient combinations, nutrients, gasses (including oxygen, carbon dioxide, nitrogen, and/or the like). In some embodiments, the fluid holding tanks 209 may be fluidly coupled to one or more of the water lines 110, the one or more pumps 150, the watering component 109, and/or the one or more airflow lines 112 (FIG. 1A) to supply the fluid contained therein to various portions of the assembly line grow pod via the one or more water lines 110 and/or the one or more airflow lines 112 (FIG. 1A) when other components control fluid flow (e.g., the one or more pumps 150 and/or the watering component 109). Still referring to FIG. 2, the fluid holding tanks 209 are otherwise not limited by the present disclosure, and may have any other features or characteristics without departing from the scope of the present disclosure.

As described above, the master controller 160 may direct the watering component 109 to provide various fluids to the trays 106 of the carts 104 and/or provide airflow to the assembly line grow pod 100 or portions thereof. More specifically, the watering component 109 may contain or be fluidly coupled to one or more pumps 150 that pump the various fluids to particular areas within the assembly line grow pod from the one or more fluid holding tanks 209.

Figure 3:
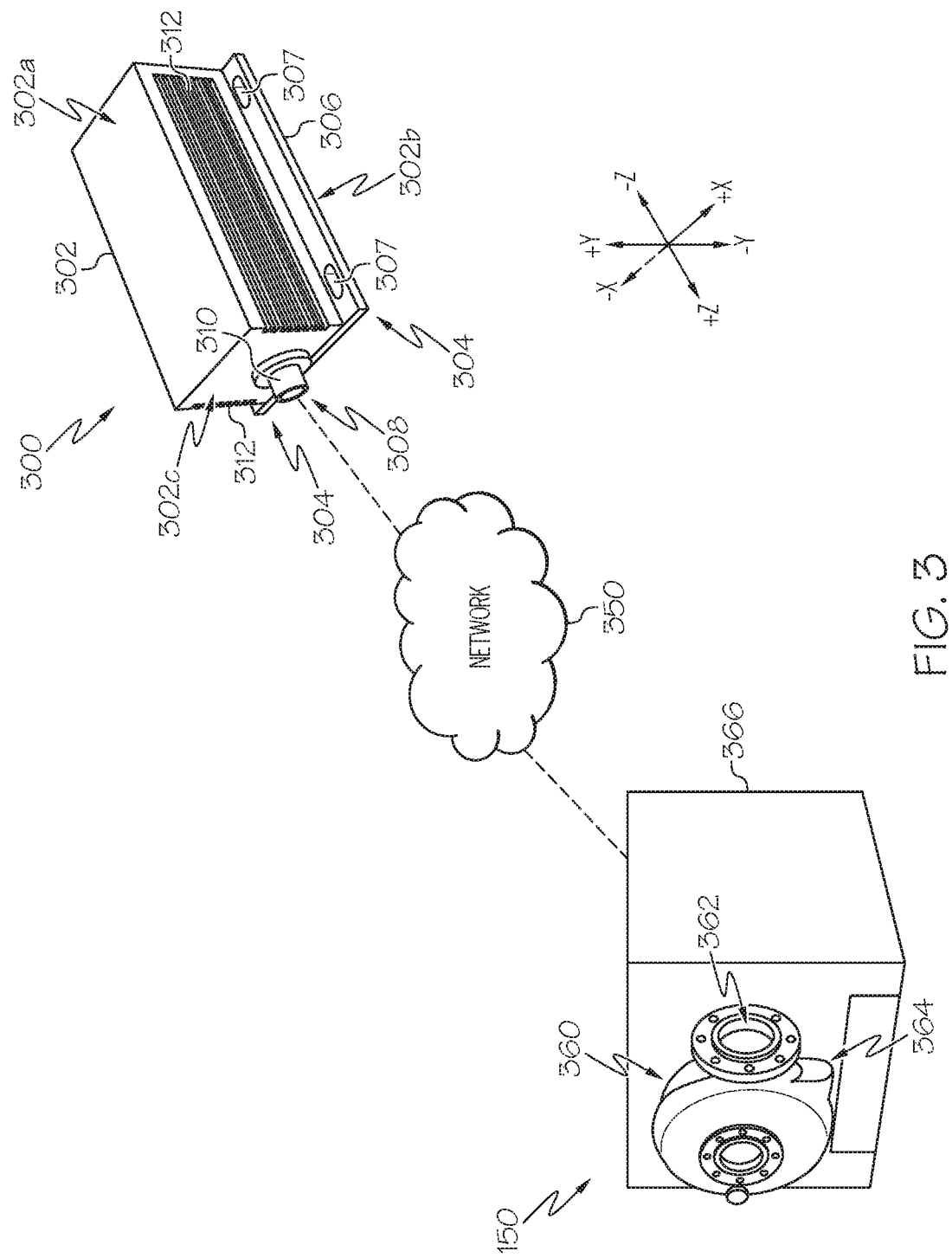
FIG. 3 schematically depicts a pump control module communicatively coupled to a pump in an assembly line grow pod network according to one or more embodiments shown and described herein.

FIG. 3 schematically depicts a pump control module 300 communicatively coupled to a pump 150 in an assembly line grow pod communications network 350 according to various embodiments. In some embodiments, the pump control module 300 may be communicatively coupled to the pump 150 via the communications network 350. The communications network 350 may include the internet or other wide area network, a local network, such as a local area network, or a near field network, such as Bluetooth or a near field communication (NFC) network. In other embodiments, instead of being connected via the communications network 350, the pump control module 300 may be directly connected to the pump 150 for the purposes of communications.

In some embodiments, communications between the pump control module 300 and the pump 150 may be such that the pump control module 300 provides transmissions, such as data and signals, to the pump 150 for the purposes of directing operation of the pump 150. That is, the pump control module 300 may direct the pump 150 when to pump fluid, when to stop pumping fluid, how much fluid to pump, a rate at which the fluid should be pumped, the direction of fluid pumping, and/or the like. In other embodiments, communications between the pump control module 300 and the pump 150 may be such that the pump control module 300 receives feedback from the pump 150. That is, the pump control module 300 may receive data, signals, or the like that are indicative of pump operation, including whether the pump 150 is operating correctly or incorrectly, start/stop logs, capacity and rate logs, whether any errors have been detected, a location of the pump 150 within the assembly line grow pod (FIG. 1A) and/or the like. Still referring to FIG. 3, the pump control module 300 may utilize this feedback to make adjustments to the pump 150, to direct other pumps 150 to pump, to communicate with other portions of the master controller 160 (FIG. 1A), and/or the like to ensure that the assembly line grow pod 100 (FIG. 1A) continues to run in an appropriate manner.

Still referring to FIG. 3, the pump control module 300 may generally include a housing 302 supported on a base 306. The base 306 may support the housing 302 within the master controller 160 (FIG. 1B), as described in greater detail herein. Still referring to FIG. 3, the housing 302 of the pump control module may include a plurality of walls, such as, for example, a first side wall 302a, a second side wall 302b, and a third side wall 302c, The first side wall 302a, the second side wall 302b, and the third side wall 302c may extend from the base 306 and at least partially define a cavity that contains various internal components of the pump control module 300, as described in greater detail herein.

In various embodiments, the pump control module 300 may further include an I/O port 308 within the housing 302. The I/O port 308 may have a body 310 that extends from the housing 302 (e.g., from the third side wall 302c of the housing 302) and allows the various internal hardware components of the pump control module 300 to be coupled to external components, such as, for example, various components of the assembly line grow pod 100 (FIG. 1A), including (but not limited to) the master controller 160 (FIG. 1B). Still referring to FIG. 3, the body 310 of the I/O port 308 may be shaped, sized, and configured to couple to a corresponding bay I/O port to facilitate communicative coupling between the pump control module 300 and the various components of the assembly line grow pod 100 (FIG. 1A), including (but not limited to) the master controller 160 and the pump 150. For example, the body 310 of the I/O port 308 may have a shape that corresponds to a receptacle in a bay I/O port such that the body 310 can be inserted within a bay I/O port, as described in greater detail herein. Still referring to FIG. 3, the I/O port 308 may be a communications port or the like that contains circuitry and/or other mechanical coupling components that allow various hardware components within the pump control module 300 to communicate with one or more other control modules and/or one or more of the various components of the assembly line grow pod 100 (FIG. 1A) via the master controller 160 (FIG. 1B) (e.g., the pump 150), as described in greater detail herein.

In various embodiments, the pump control module 300 may further include one or more features for securing the pump control module 300 to another object, such as, for example, a bay in the master controller 160 (FIG. 1B). For example, the base 306 of the pump control module 300 may extend a distance beyond the various side walls of the housing 302 (e.g., extend beyond the first side wall 302a and the second side wall 302b in the +x/−x directions of the coordinate axes of FIG. 3) to define a plurality of flanges 304 that are insertable into a support mechanism or the like, as described in greater detail herein. The flanges 304 may include one or more structures for securing the base 306 of the pump control module 300. For example, the flanges 304 may include a plurality of apertures 307 therethrough, as shown in FIG. 3. The plurality of apertures 307 may receive a retention device, such as a screw, a bolt, a clip, and/or the like to secure the base 306, as described in greater detail herein. It should be understood that the apertures 307 are merely an illustrative example of one type of feature that may be used to secure the base 306, and the present disclosure is not limited to such. That is, other securing features are also contemplated and included within the scope of the present disclosure. It should also be understood that the apertures 307 are optional components, and the base 306 may be secured by other means or may not be secured at all in some embodiments.

The various internal components of the pump control module 300 may produce heat as a byproduct of operation. As such, the pump control module 300 may incorporate one or more cooling features therein to dissipate the heat generated by the internal components thereof in some embodiments. For example, the housing 302 of the pump control module 300 may include one or more heat dissipating fins 312 disposed thereon in some embodiments. That is, the first side wall 302a and/or the second side wall 302b may each include the heat dissipating fins 312. Other features for dissipating heat may also be used in addition to (or as an alternative to) the heat dissipating fins 312.

The various internal components of the pump control module 300 may generally provide the functionality of the pump control module 300, as described herein. That is, the internal components of the pump control module 300 may be a computing environment. Additional details regarding the internal components of the pump control module 300 are discussed herein with respect to FIG. 4.

Still referring to FIG. 3, the pump 150 may generally include a housing 366 holding a plurality of hardware components that allow the pump 150 to communicate with the pump control module 300. The pump 150 may include a pumping mechanism 360 that functions to pump fluid from a fluid inlet port 364 to a fluid outlet port 362.

The pumping mechanism 360 may generally be any mechanism that is used for the purposes of pumping fluid, including a particularly measured amount of fluid. For example, the pumping mechanism 360 may be a positive displacement pump, a centrifugal pump, or a roto-dynamic pump. Illustrative positive displacement pumps include rotary pumps such as gear pumps, screw pumps, and rotary vane pumps; reciprocating pumps such as plunger pumps, diaphragm pumps, piston pumps, and radial piston pumps; and linear pumps such as rope pumps and chain pumps. Other specific examples of pumps that may be used for the pumping mechanism 360 include, but are not limited to, progressing cavity pumps, roots-type pumps, impulse pumps, hydraulic ram pumps, radial flow pumps, axial flow pumps, mixed flow pumps, eductor jet pumps, gravity pumps, and valveless pumps. The particular type of pumping mechanism may be dependent on the type of fluid that is being pumped (e.g., air, water, nutrients, etc.), the average amount of fluid that is pumped, whether a constant flow of fluid is provided or only a measured amount of fluid is provided, the distance the fluid has to travel, and/or the like.

Control of the pumping mechanism 360 may be completed by the various hardware components within the housing 366. That is, the various hardware components may transmit a start signal, a stop signal, a signal to change pump speed, capacity, pressure of fluid, and/or the like to the pumping mechanism 360. It should be understood that the hardware components within the pumping mechanism 360 may be configured to complete all of the processes described herein with respect to the pump control module 300, such that, in the event that the pump control module 300 is hot swappable and swapped out of the master controller 160 (FIG. 1A), the various components within the housing 366 and/or other pump control modules located within the master controller 160 (FIG. 1A) can also be utilized to control the various pumping processes described herein. Illustrative examples of components that may be included within the housing 366 include, but are not limited to, a processing device, a memory, various logic modules, a data storage component, input/output hardware, network interface hardware, and/or the like. The various hardware components within the housing 366 may be similar to the hardware components described with respect to the components located in the pump control module 300 in FIG. 4. As such, the hardware components within the housing 302 are not described in further detail herein.

Referring to FIGS. 1A and 3, both the fluid inlet port 364 and the fluid outlet port 362 may be fluidly coupled to one or more of the water lines 110 or one or more of the airflow lines 112 of the assembly line grow pod 100. As such, fluid from the water lines 110 or airflow lines 112 coupled to the fluid inlet port 364 may be received by the pumping mechanism 360 and ejected out of the water lines 110 or airflow lines 112 coupled to the fluid outlet port 362. As such, the fluid inlet port 364 may generally be fluidly coupled (via the water lines 110 or the airflow lines 112) to a fluid source (e.g., the fluid holding tanks 209 depicted in FIG. 1B). In addition, the fluid outlet port 362 may be fluidly coupled (via the water lines 110 or the airflow lines 112) to a fluid delivery component (e.g., a fluid delivery manifold, an air duct, etc.). It should be understood that the use of the term "inlet" and "outlet" herein is merely illustrative, as the pumping mechanism 360 may be configured to reverse direction, thereby reversing the direction of fluid flow through the fluid inlet port 364 and the fluid outlet port 362 in some embodiments.

In operation, the pump 150 may receive one or more signals and/or data from the pump control module 300, determine various pump parameters (e.g., flow rate, capacity, pressure of fluid provided, etc.) from the signals and/or data, and direct the pumping mechanism 360 to operate accordingly by drawing fluid in via the fluid inlet port 314 and pushing fluid out via the fluid outlet port 316.

While FIG. 3 depicts a single pump control module 300 and a single pump 150, this is merely illustrative. For example, a single pump control module 300 may be coupled to a plurality of pumps 150. In another example, a plurality of pump control modules 300 may each be connected to a plurality of pumps 150. Other combinations of pump control modules 300 and pumps 150 are included within the scope of the present disclosure.

Figure 4:
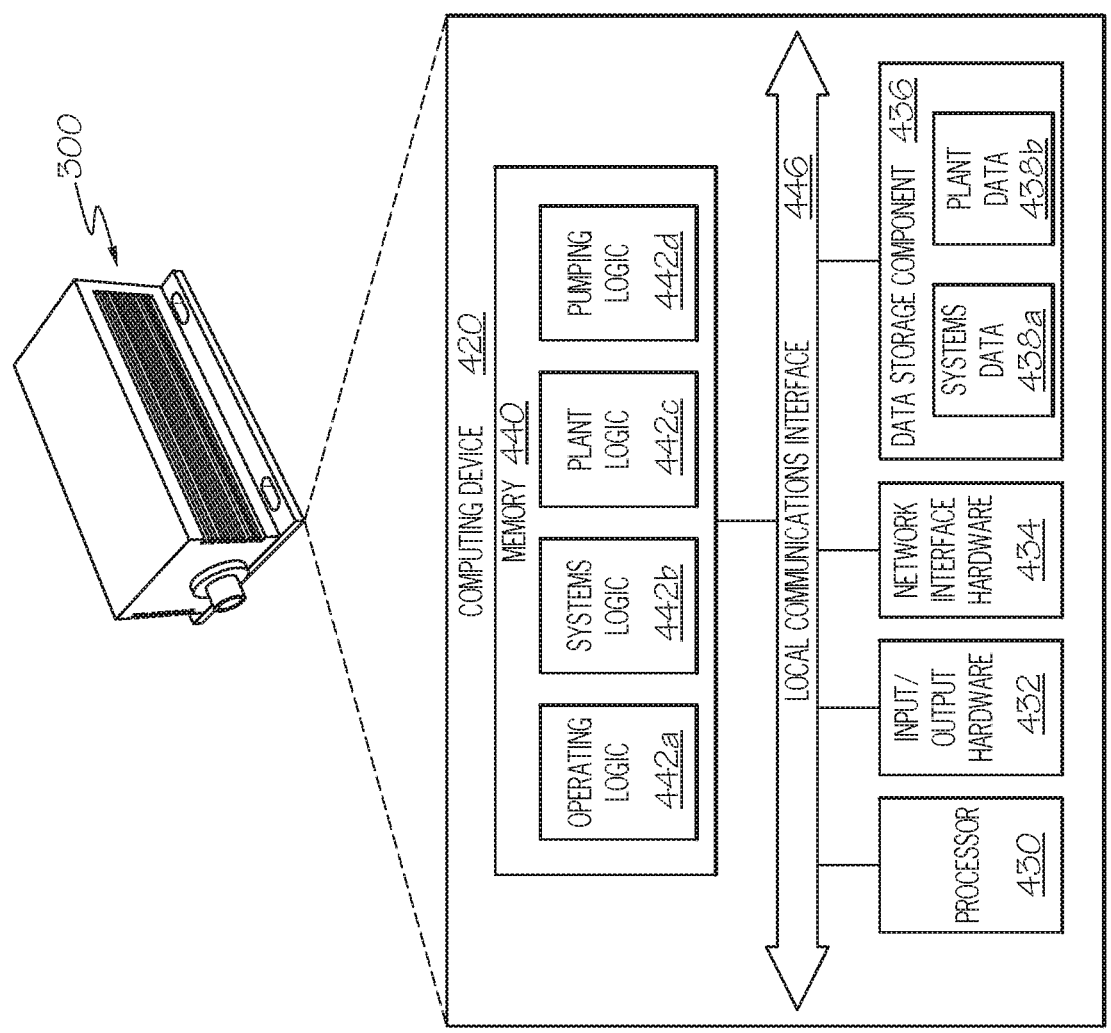
FIG. 4 depicts an illustrative computing environment within a pump control module according to one or more embodiments shown and described herein.

FIG. 4 depicts an illustrative computing environment within the pump control module 300 according to one or more embodiments. As illustrated in FIG. 4, the pump control module 300 may include a computing device 420. The computing device 420 includes a memory component 440, a processor 430, input/output hardware 432, network interface hardware 434, and a data storage component 436 (which stores systems data 438a, plant data 438b, and/or other data).

At least a portion of the components of the computing device 420 may be communicatively coupled to a local interface 446. The local interface 446 is generally not limited by the present disclosure and may be implemented as a bus or other communications interface to facilitate communication among the components of the pump control module 300 coupled thereto.

The memory component 440 may be configured as volatile and/or nonvolatile memory. As such, the memory component 440 may include random access memory (including SRAM, DRAM, and/or other types of RAM), flash memory, secure digital (SD) memory, registers, compact discs (CD), digital versatile discs (DVD), Blu-Ray discs, and/or other types of non-transitory computer-readable mediums. Depending on the particular embodiment, these non-transitory computer-readable mediums may reside within the pump control module 300 and/or external to the pump control module 300. The memory component 440 may store, for example, operating logic 442a, systems logic 442b, plant logic 442c, pumping logic 442d, and/or other logic. The operating logic 442a, the systems logic 442b, the plant logic 442c, and pumping logic 442d may each include a plurality of different pieces of logic, at least a portion of which may be embodied as a computer program, firmware, and/or hardware, as an example.

The operating logic 442a may include an operating system and/or other software for managing components of the pump control module 300. As described in more detail below, the systems logic 442b may monitor and control operations of one or more of the various other control modules and/or one or more components of the assembly line grow pod 100 (FIG. 1A). Still referring to FIG. 4, the plant logic 442c may be configured to determine and/or receive a recipe for plant growth and may facilitate implementation of the recipe via the systems logic 442b and/or the pumping logic 442d. The pumping logic 442d may be configured to determine which ones of a plurality of pumps need to be activated or deactivated to facilitate fluid movement throughout the assembly line grow pod 100 (FIG. 1A) according to a recipe and/or a need for fluid at a particular location at a particular time, determine a rate of fluid to be pumped, determine an amount of fluid to be pumped, determine a direction of fluid to be pumped, transmit signals and/or data to the various pumps, and/or the like.

It should be understood that while the various logic modules are depicted in FIG. 4 as being located within the memory component 440, this is merely an example. For example, the systems logic 442b, the plant logic 442c, and the pumping logic 442d may reside on different computing devices. That is, one or more of the functionalities and/or components described herein may be provided by a user computing device, a remote computing device, and/or another control module that is communicatively coupled to the pump control module 300.

Additionally, while the computing device 420 is illustrated with the systems logic 442b and the plant logic 442c as separate logical components, this is also an example. In some embodiments, a single piece of logic (and/or or several linked modules) may cause the computing device 420 to provide the described functionality.

The processor 430 (which may also be referred to as a processing device) may include any processing component operable to receive and execute instructions (such as from the data storage component 436 and/or the memory component 440). Illustrative examples of the processor 430 include, but are not limited to, a computer processing unit (CPU), a many integrated core (MIC) processing device, an accelerated processing unit (APU), a digital signal processor (DSP). In some embodiments, the processor 430 may be a plurality of components that function together to provide processing capabilities, such as integrated circuits (including field programmable gate arrays (FPGA)) and the like.

The input/output hardware 432 may include and/or be configured to interface with microphones, speakers, a display, and/or other hardware. That is, the input/output hardware 432 may interface with hardware that provides a user interface or the like. For example, a user interface may be provided to a user for the purposes of adjusting settings (e.g., an amount of nutrients/water to be supplied, a type and amount of ambient air conditions to be supplied, etc.), viewing a status (e.g., receiving a notification of an error, a status of a particular pump or other component, etc.), and/or the like.

The network interface hardware 434 may include and/or be configured for communicating with any wired or wireless networking hardware, including an antenna, a modem, LAN port, wireless fidelity (Wi-Fi) card, WiMax card, ZigBee card, Z-Wave card, Bluetooth chip, USB card, mobile communications hardware, and/or other hardware for communicating with other networks and/or devices. From this connection, communication may be facilitated between the pump control module 300 and other components of the assembly line grow pod 100 (FIG. 1A), such as, for example, other control modules, the seeder component, the harvesting component, the watering component, the one or more pumps, and/or the like. In some embodiments, the network interface hardware 434 may also facilitate communication between the pump control module 300 and components external to the assembly line grow pod 100 (FIG. 1A), such as, for example, user computing devices and/or remote computing devices. As such, the network interface hardware 434 may be communicatively coupled to the I/O port 308 of the pump control module 300 (FIG. 3).

Still referring to FIG. 4, the pump control module 300 may be coupled to a network (e.g., the communications network 350 (FIG. 3)) via the network interface hardware 434. As previously described herein, various other control modules, other computing devices, and/or the like may also be coupled to the network. Illustrative other computing devices include, for example, a user computing device and a remote computing device. The user computing device may include a personal computer, laptop, mobile device, tablet, server, etc. and may be utilized as an interface with a user. As an example, a user may send a recipe to the computing device 420 for at least a partial implementation by the pump control module 300. Another example may include the pump control module 300 sending notifications to a user of the user computing device.

Similarly, the remote computing device may include a server, personal computer, tablet, mobile device, etc. and may be utilized for machine to machine communications. As an example, if the assembly line grow pod 100 (FIG. 1A) determines a type of seed being used (and/or other information, such as ambient conditions), the computing device 420 may communicate with the remote computing device to retrieve a previously stored recipe for those conditions. As such, some embodiments may utilize an application program interface (API) to facilitate this or other computer-to-computer communications.

Still referring to FIG. 4, the data storage component 436 may generally be any medium that stores digital data, such as, for example, a hard disk drive, a solid state drive (SSD), Optane® memory (Intel Corporation, Santa Clara Calif.), a compact disc (CD), a digital versatile disc (DVD), a Blu-Ray disc, and/or the like. It should be understood that the data storage component 436 may reside local to and/or remote from the pump control module 300 and may be configured to store one or more pieces of data and selectively provide access to the one or more pieces of data. As illustrated in FIG. 4, the data storage component 436 may store systems data 438a, plant data 438b, and/or other data. The systems data 438a may generally include data relating to the functionality of the pump control module 300, such as stored settings, information regarding the location of the pump control module 300 and/or other modules within the master controller 160 (FIG. 1B), and/or the like. The plant data 438b may generally relate to recipes for plant growth, settings of various components within the assembly line grow pod 100 (FIG. 1A), data relating to control of the pumps 150 (FIG. 1A), sensor data relating to a particular tray or cart, and/or the like.

It should be understood that while the components in FIG. 4 are illustrated as residing within the pump control module 300, this is merely an example. In some embodiments, one or more of the components may reside external to the pump control module 300. It should also be understood that, while the pump control module 300 is illustrated as a single device, this is also merely an example. That is, the pump control module 300 may be a plurality of devices that are communicatively coupled to one another and provide the functionality described herein.

Figure 5:
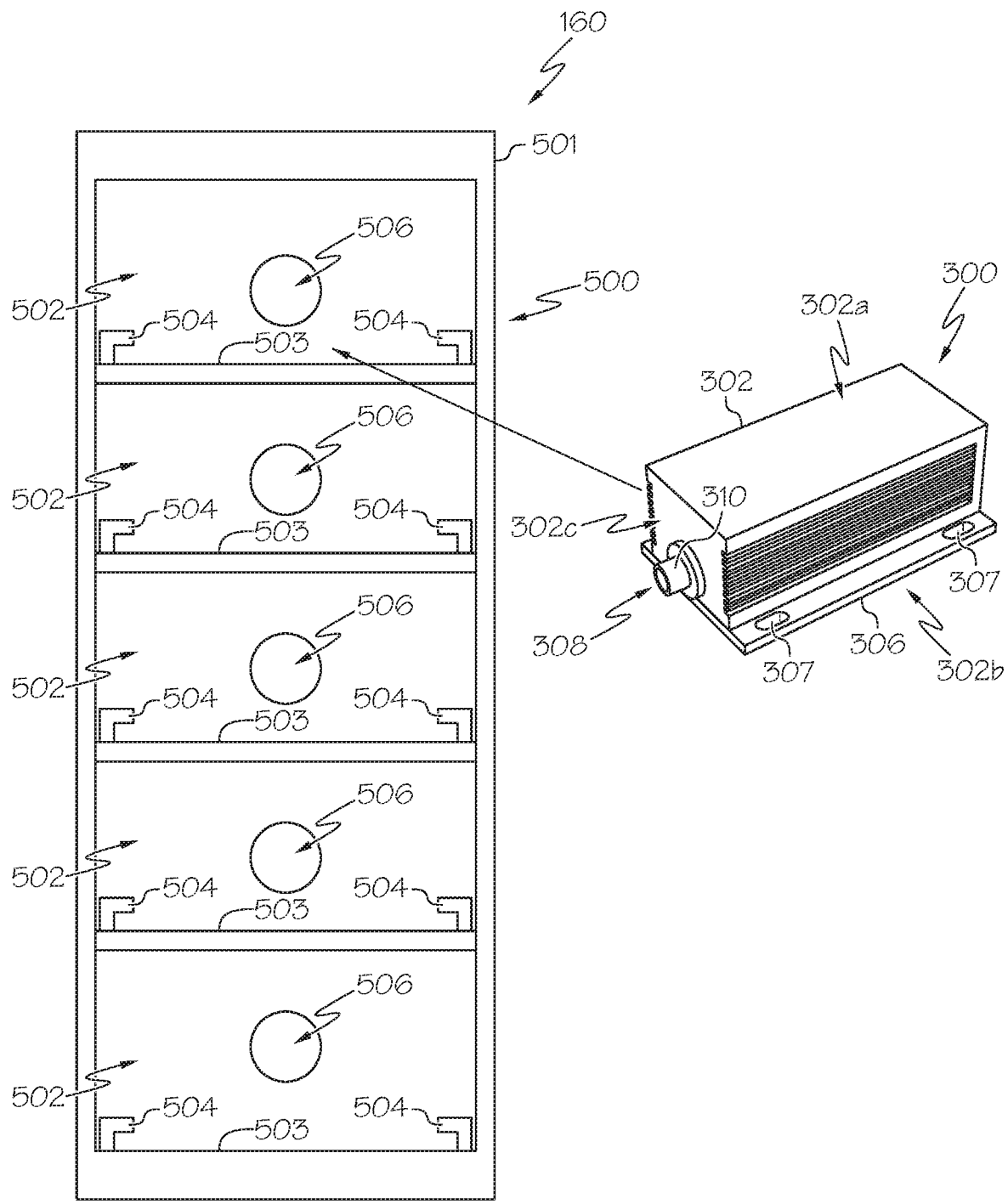
FIG. 5 schematically depicts an illustrative modular control interface of a master controller that receives a pump control module according to one or more embodiments shown and described herein.

FIG. 5 schematically depicts an illustrative modular control interface 500 of a master controller 160 that receives a pump control module 300 according to various embodiments. As illustrated, the master controller 160 may be configured with a modular control interface 500 that can support the pump control module 300 and/or one or more other control modules. As such, the master controller 160 may include a plurality of bays 502 in which the pump control module 300 can be placed. Each bay 502 is generally a cavity within a body 501 of the master controller 160 that is sized and shaped to receive any control module, including the pump control module 300. In addition, each bay 502 may have the same or substantially similar shape and size as the other bays 502 of the master controller 160 such that the pump control module 300 and/or other modules can be inserted in any bay 502. That is, no bay 502 is particularly shaped to only accept the pump control module 300 and there is no bay that cannot accept the pump control module 300.

Figure 6:
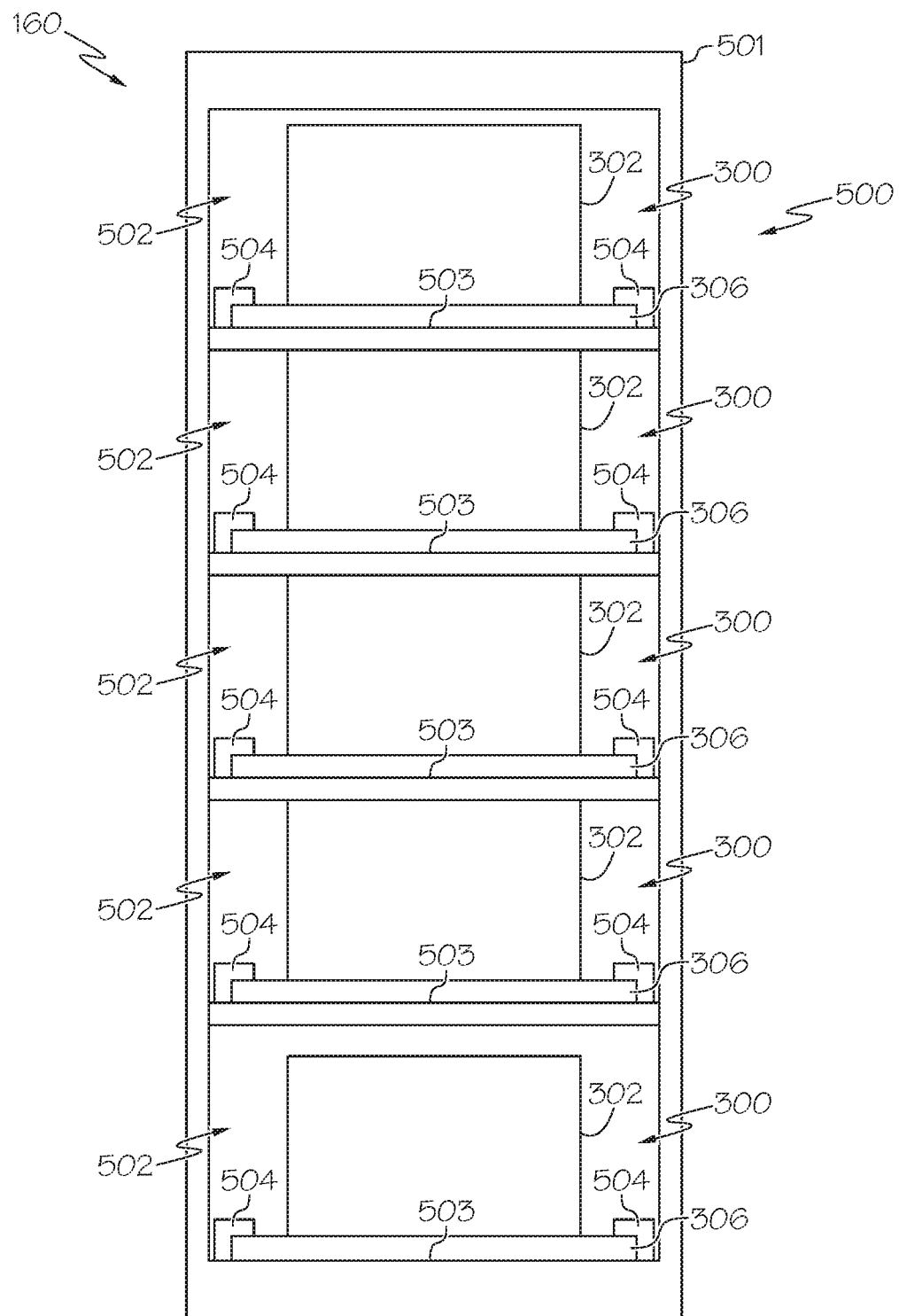
FIG. 6 schematically depicts an illustrative master controller holding a plurality of illustrative control modules according to one or more embodiments shown and described herein.

At least some of the plurality of bays 502 may further include a floor 503 and/or a support mechanism 504. The floor 503 may generally be a lower surface of each bay 502 that supports the pump control module 300 when placed therein. As such, each floor 503 may be part of the body 501 of the master controller 160. In some embodiments, the support mechanism 504 may be a rail or the like that supports the base 306 of the pump control module 300 when the pump control module 300 is inserted into a respective bay. In addition, the support mechanism 504 may also act as a guide to ensure that the pump control module 300 is appropriately inserted and positioned within the bay 502. For example, as depicted in FIG. 6, at least some of the support mechanisms 504 in each bay 502 accepts the corresponding base 306 of the pump control module 300 such that the pump control module 300 slides into the bay 502 in the correct positioning and ensures that the I/O port 308 is appropriately positioned, as described hereinbelow.

Referring again to FIG. 5, the support mechanisms 504 may further be arranged, shaped, and sized to hold the pump control module 300 in place when the pump control module 300 is placed within a bay 502 in some embodiments. In addition, the support mechanisms 504 may further be molded to receive a securing device to secure the pump control module 300 within the bay 502 (e.g., clips, bolts, screws, and/or the like that are inserted into the apertures 307 in the base 306 and affixed to (or integrated with) the support mechanisms 504). It should be understood that the particular arrangement and configuration of the support mechanisms 504 and the bases 306 are merely illustrative, and other means of ensuring that the pump control module 300 is appropriately placed and positioned within the bay 502 are possible without departing from the scope of the present disclosure.

Still referring to FIG. 5, at least a portion of the plurality of bays 502 may further include a bay I/O port 506. The bay I/O port 506 may correspond to the I/O port 308 of the pump control module 300 such that the bay I/O port 506 and the I/O port 308 of the pump control module 300 can be matingly coupled together. For example, the bay I/O port 506 may be shaped and/or sized to correspond to the body 310 of the I/O port 308 such that the I/O port 308 is insertable within the bay I/O port 508 (e.g., the bay I/O port 506 is generally the same or substantially similar shape and slightly larger than the body 310 of the I/O port 308). In embodiments, the bay I/O port 506 may contain various communications components such that, when the bay I/O port 506 is mated to the I/O port 308 of the pump control module 300, communications between the pump control module 300 and other devices communicatively coupled via the bay I/O port 506 can occur. For example, the bay I/O port 506 may allow the pump control module 300 to send and/or receive transmissions to/from the various other control modules and/or one or more components of the assembly line grow pod 100 (FIG. 1) via the I/O port 308.

The circuitry contained within each of the bay I/O ports 506 may be communicatively coupled to various other components of the master controller 160 such that signals, data, and/or the like can be transmitted to the master controller 160, other control modules, and/or one or more components of the assembly line grow pod 100 (FIG. 1) by the pump control module 300 when the pump control module 300 is inserted in one of the bays 502 of the master controller 160 and the bay I/O port 506 and the I/O port 308 are coupled together.

Since at least some of the bays 502 are identical (or substantially similar) in shape and size and contain similar components (e.g., floors 503, support mechanisms 504, and bay I/O ports 506), the pump control module 300 can be placed in any one of the bays 502 in order to operate. Certain bays 502 may remain vacant and ready to accept any control module, as depicted in FIG. 7.

It should be understood that the various components of the master controller 160 described herein allow the pump control module 300 (in addition to other control modules) to be hot swappable (which may also be referred to herein as "removably insertable") within the master controller 160. That is, the pump control module 300 can be inserted into a bay 502 of the master controller 160 at any time to function. Furthermore, removal of the pump control module 300 from a bay 502 will not alter the functionality of other control modules inserted in other bays 502. As such, a user may remove the pump control module 300 from a bay 502 at any time without altering the functionality of the remaining installed control modules. Similarly, another control module may be removed while the pump control module 300 remains in a bay 502 and the pump control module 300 will continue to function as described herein. This may be particularly useful in situations where it may be necessary to remove a control module from a bay 502 without shutting down the entire assembly line grow pod 100 (FIG. 1) to do so.

Figure 7:
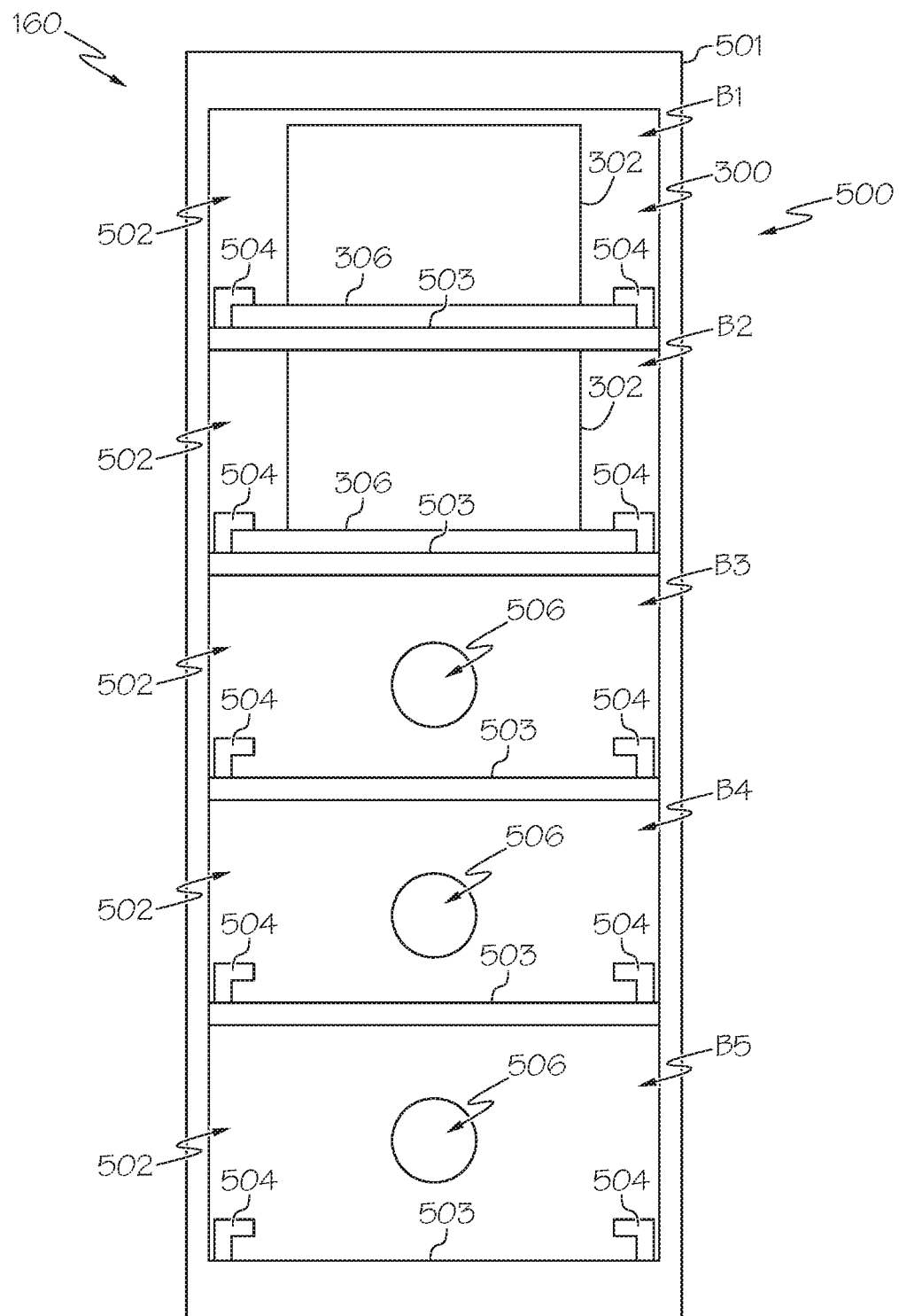
FIG. 7 schematically depicts an illustrative master controller holding a plurality of illustrative control modules and having a plurality of empty bays according to one or more embodiments shown and described herein.

It should also be understood that the master controller 160 need not have all of the bays 502 filled with a control module to operate the assembly line grow pod 100, For example, as particularly shown in FIG. 7, a portion of the bays 502 may be "filled" bays (e.g., containing a control module such as the pump control module 300), such as bays B1, B2, and B4. Likewise, a portion of the bays 502 may be "empty" bays (e.g., not containing a control module), such as bays B3 and B4. Even with empty bays B3 and B4, the master controller 160 may still be able to provide all of the functionality for the assembly line grow pod 100 (FIG. 1), as described herein. Empty bays 133 and 34 may be used to insert future control modules, such as modules that control additional components that are added to the assembly line grow pod 100 (FIG. 1) and/or modules that increase the efficiency of operation of the assembly line grow pod 100.

Figure 8:
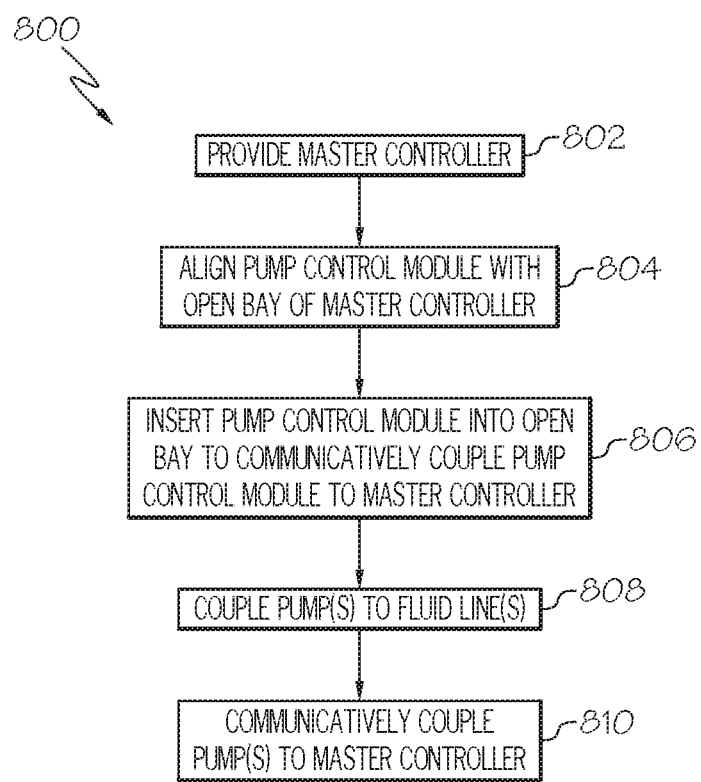
FIG. 8 depicts a flow diagram of an illustrative method of providing a pump control module for a modular control interface and providing one or more pumps according to one or more embodiments shown and described herein.

FIG. 8 depicts a flow diagram of an illustrative method of providing a pump control module for a modular control interface and providing one or more pumps, generally designated 800, according to various embodiments. Referring also to FIGS. 1A-5, the method 800 includes providing the master controller 160 at block 802. At block 804, a pump control module 300 is aligned with an open bay 502 of the master controller 160, as described in greater detail herein. Accordingly, the pump control module 300 is inserted within the open bay 502 of the master controller 160 so as to be communicatively coupled with the master control module at block 806, as described in greater detail herein.

At block 808, the one or more pumps 150 may be coupled to one or more fluid lines, including the one or more water lines 110 and the one or more airflow lines 112. For example, the one or more water lines 110 or the one or more airflow lines 112 within the assembly line grow pod 100 may be coupled to the one or more pumps 150 in such a manner that the pump 150 receives fluid from a first particular location and ejects the fluid to a second particular location. More specifically, a pump 150 may be coupled between the watering component 109 and a water delivery location. A water line 110 may be coupled from the watering component 109 to the pump 150 (e.g., the fluid inlet port 364 of the pumping mechanism 360) and another water line 110 may be coupled from the pump (e.g., the fluid outlet port 362 of the pumping mechanism 360) to the water delivery location. The relative distances between a fluid source, the pump 150, and a fluid destination via the fluid lines (e.g., the water lines 110 and the airflow lines 112) is not limited by this disclosure, and the pump 150 may be placed at any location that allows the pump 150 to effectively move fluid, as described herein.

At block 810, each of the installed pumps 150 within the assembly line grow pod 100 may be communicatively coupled to the master controller 160, particularly the pump control module 300 therein. As previously described herein, the pumps 150 (and/or a portion thereof, such as the hardware components within the housing 366) may be communicatively coupled (either via a wired or wireless connection) to the pump control module 300 (e.g., via the network interface hardware 434 of the pump control module 300). In some embodiments, the pumps 150 may be directly coupled to the pump control module 300. In other embodiments, the pumps 150 may be coupled to the pump control module 300 via a network (e.g., communications network 350). In embodiments including a series of pumps 150 (e.g., a plurality of pumps fluidly coupled in series to one another via fluid lines), each pump 150 may be communicatively coupled in series to the pump control module 300 such that a first pump 150 is communicatively coupled to the pump control module 300, a second pump 150 is communicatively coupled to the first pump 150, and so on.

Figure 9:
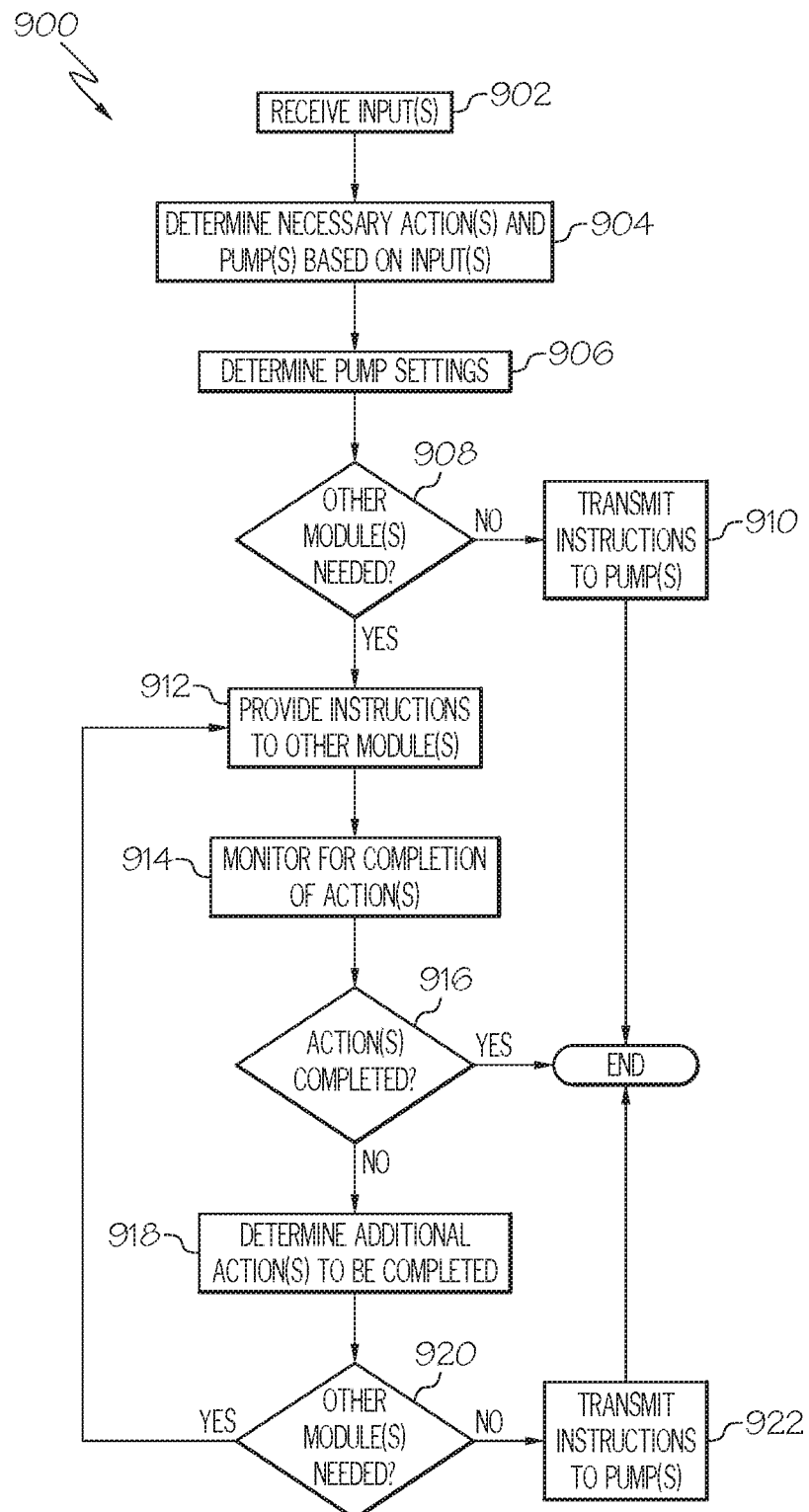
FIG. 9 depicts a flow diagram of an illustrative method of operating one or more pumps in an assembly line grow pod with a pump control module in a master controller according to one or more embodiments shown and described herein.

Once inserted, the pump control module 300 may complete one or more processes to operate the assembly line grow pod 100 and/or a component thereof, (e.g., operate the one or more pumps 150). FIG. 9 depicts a flow diagram of an illustrative method of operating an assembly line grow pod 100 with a pump control module 300 in a master controller 160, generally designated 900, according to one or more embodiments. At block 902, the pump control module 300 may receive one or more inputs. The one or more inputs may generally contain information regarding fluid within the assembly line grow pod. For example, the pump control module 300 may receive a command from a user, data from one or more sensors, an input from another control device, and/or the like. Illustrative examples of one or more inputs include, but are not limited to, inputs that relate to commands to start or stop pumping of a particular pump 150 at a particular time, inputs that relate to commands to carry out a particular recipe as it pertains to pumping fluid, inputs that relate to commands to change various pumping settings, sensor inputs from various sensors regarding the status of the assembly line grow pod 100, components thereof, and/or plants growing within the grow pod, inputs relating to commands from other control devices, and/or the like.

At block 904, the pump control module 300 determines the necessary actions to be completed and which of the one or more pumps 150 are to be used based on the inputs that were received at block 902. The actions may generally be one or more instructions, signals (e.g., control signals), or the like for operation of the one or more pumps 150 (e.g., for providing fluid, pressurizing fluid, and/or the like).

For example, if the input relates to a command to start placement of seeds on a particular tray, the pump control module 300 may determine that the actions include transmitting one or more signals to the pumps 150 that supply water to watering devices located adjacent to a track so that the watering devices have enough water to water the new seeds when the seeds pass the watering devices on the track after placement. In some embodiments, such actions may also be completed by other control modules located within the master controller 160. For example, a seeder control module may be inserted in a bay 502 of the master controller 160, and thus an action that corresponds to supplying water to a watering device after seed placement may optionally be controlled by the seeder control module instead of or in addition to the pump control module 300.

At block 906, pump settings may be determined by the pump control module 300. That is, the type of pump, the functionality of the pump, the location of the pump, location of adjacent pumps, various pump parameters (e.g., capacity, volume, etc.) may be determined for the purposes of determining how the pump will be used to supply fluid. For example, the type of pump (e.g., water pump, air pump, etc.) may be determined for the purposes of determining the type of fluid to be pumped. The location of the pump and/or the location of adjacent pumps may be determined for the purposes of determining where in the assembly line grow pod fluid can be pumped. The various pump parameters may be determined for the purposes of determining how much fluid can be pumped to a particular area in a particular amount of time, whether fluid flow can be reversed by the pump, and/or the like. As a result of determining pump settings, the pump control module 300 can determine how best to utilize a particular pump to complete various pumping tasks for supplying and pressurizing fluid within the assembly line grow pod 100.

In addition to determining pump settings for the purposes of utilizing particular pumps, the pump control module 300 may determine whether other module(s) for controlling actions are needed at block 908. Such a determination may be completed, for example, by recognizing certain module(s) that can complete a particular action that may work in conjunction with the pump control module 300 and/or the pumps to complete an action. For example, a valve control module and/or one or more valves may be used in conjunction with the pump control module 300 and/or one or more pumps to direct fluid, pressurize fluid, and/or the like. In some embodiments, the determination at block 908 may also include determining whether particular other modules within the master controller 160 are available. If no other module(s) are needed or available to control the actions, the process may continue at block 910. If other module(s) are needed or available to control the actions, the process may continue at block 912.

At block 910, the pump control module 300 may complete the determined actions when no other module(s) are needed or available to complete the actions. For example, if the determined action is to open a particular valve and no valve control module (or other control module that can also control valves) is inserted or available within the master controller 160, the pump control module 300 may transmit a signal to cause the valve to open.

At block 912, instructions are provided to the other module(s) for carrying out the determined action(s). For example, the pump control module 300 may transmit one or more signals to the other module(s), where the one or more signals correspond to the command. That is, if a valve needs to be operated (e.g., opened or closed) in conjunction with operation of a particular pump, the pump control module 300 may transmit one or more signals to a valve control module such that the valve control module directs operation of the valve.

In addition, the pump control module 300 may monitor one or more portions of the assembly line grow pod 100 to ensure the action(s) are completed by the other modules at block 914. That is, the pump control module 300 may receive signals and/or data from sensors, from portions of the assembly line grow pod 100, from the master controller 160, from the other control modules, and/or the like that are indicative of whether the action(s) were completed. For example, if an action included closing a particular valve, the pump control module 300 may receive sensor data from sensors at the valve or downstream from the valve, where the sensor data indicates whether a flow of water from the valve exists. Data indicating that a water flow does exist may be used by the pump control module 300 to determine that the valve was not closed. As such, the pump control module may determine at block 916 whether the action(s) were completed. If the actions were completed, the process may end. If the actions were not completed, the process may proceed to block 918.

At block 918, the pump control module 300 may determine additional action(s) to be completed. These additional actions may generally be actions to replace those that were not completed above. As such, the action(s) may be the same or substantially similar (e.g., transmitting a signal to a valve corresponding to a command to close the valve) in some embodiments. However, the actions may also be different in other embodiments (e.g., transmitting a signal to one or more other pumps and/or one or more other valves). For example, new actions may be determined if only a portion of the actions were carried out. In another example, new alternative actions may be determined if the failure to carry out an action was due to a faulty component, thus necessitating the need for a redundant system to carry out particular actions. Accordingly, the pump control module 300 may determine again whether these new actions are to be completed by other control modules within the master controller 160. If so, the process may repeat at block 912. If not, the pump control module 300 may complete the actions at block 922 (e.g., transmit instructions to one or more pumps and/or the like) and the process may end.

As illustrated above, various embodiments for providing a pump control module for a modular control interface and for providing one or more pumps in an assembly line grow pod are disclosed. These embodiments create a particular pump control interface that provides signals to and/or receives signals from any one of the various components of the assembly line grow pod, including other control modules, and particularly pumps within the assembly line grow pod.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for providing a pump control module for a modular control interface in an assembly line grow pod and for providing one or more pumps within an assembly line grow pod for the purposes of directing fluid flow, pressurizing fluid, and/or the like within the assembly line grow pod. It should also be understood that these embodiments are merely exemplary and are not intended to limit the scope of this disclosure.

What is claimed is:

1. An assembly line grow pod comprising:
one or more pumps;
a master controller comprising a plurality of bays, the master controller communicatively coupled to the one or more pumps; and
a pump control module received within a first bay of the plurality of bays of the master controller such that the pump control module is communicatively coupled to the master controller and the one or more pumps,
wherein the pump control module is programmed to receive information regarding a unique fluid requirement for each of a first location and a second location within the assembly line grow pod, determine one or more control signals necessary to provide or pressurize the fluid for delivery of a first amount of fluid to the first location within the assembly line grow pod and the second amount of fluid to a second location within the assembly line grow pod based on the unique fluid requirement for each of the first location and the second location, and provide one or more control signals to the one or more pumps to operate in accordance with the one or more control signals.

2. The assembly line grow pod of claim 1, wherein the pump control module is removably insertable such that the pump control module is removable from the first bay of the plurality of bays without altering a functionality of the one or more pumps within the assembly line grow pod.

3. The assembly line grow pod of claim 1, wherein the pump control module is fixed within the first bay of the plurality of bays of the master controller such that the pump control module is not removable from the master controller.

4. The assembly line grow pod of claim 1, further comprising a second control module that controls one or more components of the assembly line grow pod.

5. The assembly line grow pod of claim 4, further comprising:
a track; and
a plurality of carts supporting trays, the plurality of carts movable along the track,
wherein the second control module provides one or more control signals to the plurality of carts to cause movement of the plurality of carts along the track.

6. The assembly line grow pod of claim 5, wherein the pump control module directs the one or more pumps to pump water to the trays when passing a predetermined portion of the track.

7. The assembly line grow pod of claim 4, further comprising:
one or more lighting devices;
a seeder component;
a harvester component; and
a sanitizer component,
wherein the second control module in the master controller provides one or more control signals to the one or more lighting devices, the seeder component, the harvester component, and the sanitizer component.

8. The assembly line grow pod of claim 1, wherein at least one of the one or more pumps are fluidly coupled to a fluid source via one or more water lines that are fluidly coupled to the first location and to the second location.

9. The assembly line grow pod of claim 8, wherein the fluid source is a watering component that supplies one or more of water and nutrients to plants that are grown in the assembly line grow pod.

10. The assembly line grow pod of claim 1, wherein the one or more pumps are fluidly coupled to a fluid delivery component located at each one of a plurality of watering stations via one or more water lines.

11. The assembly line grow pod of claim 1, wherein the one or more pumps are fluidly coupled to one or more airflow lines, the one or more airflow lines extending to the first location and to the second location.

12. A master controller in an assembly line grow pod, the master controller comprising:
a plurality of bays, each one of the plurality of bays comprising a bay I/O port that is communicatively coupled to one or more pumps in the assembly line grow pod; and
a pump control module received within a first bay of the plurality of bays of the master controller, the pump control module comprising:
an I/O port communicatively coupled to the bay I/O port,
a processing device, and
a non-transitory, processor-readable storage medium comprising one or more programming instructions stored thereon that, when executed, cause the processing device to:
receive an input corresponding to one or more unique fluid requirements for each of a first location and a second location within the assembly line grow pod,
determine an action to be completed based on the input, wherein the action comprises operation of the one or more pumps in the assembly line grow pod to supply a first amount of fluid to the first location within the assembly line grow pod and a second amount of fluid to the second location within the assembly line grow pod in accordance with the one or more unique fluid requirements for each of the first location and the second location, and
transmit an instruction to the one or more pumps, the instruction directing the operation of the one or more pumps to supply the first amount of fluid to the first location and the second amount of fluid to the second location.

13. The master controller of claim 12, wherein the one or more programming instructions, when executed, further cause the processing device to:
receive a second input;
determine a second action to be completed based on the second input, wherein the second action comprises providing one or more second instructions or signals for operation of one or more components of the assembly line grow pod;
determine a second control module is available or exists within the plurality of bays for completing the second action; and
directing the second control module to complete the second action.

14. The master controller of claim 12, wherein the one or more programming instructions, when executed, further cause the processing device to:
receive a second input;
determine a second action to be completed based on the second input, wherein the second action comprises providing one or more second instructions or signals for operation of one or more components of the assembly line grow pod;

determine that a second control module is not available within the plurality of bays for completing the second action; and complete the second action on behalf of the second control module.

15. The master controller of claim 12, wherein the pump control module comprises a housing supported on a base, the housing comprising the processing device and the non-transitory, processor-readable storage medium.

16. The master controller of claim 12, wherein the pump control module is removably insertable such that the pump control module is removable from the first bay of the plurality of bays without altering a functionality of the assembly line grow pod or the one or more pumps.

17. The master controller of claim 12, wherein the pump control module is fixed within the first bay of the plurality of bays of the master controller such that the pump control module is not removable from the master controller.

18. A pump control module comprising:

a processing device, and a non-transitory, processor-readable storage medium comprising one or more programming instructions stored thereon that, when executed, cause the processing device to:

receive an input corresponding to one or more unique fluid requirements for each of a first location and a second location within the assembly line grow pod;

determine an action to be completed based on the input, wherein the action comprises operation of one or more pumps in an assembly line grow pod to supply a first amount of fluid to the first location within the assembly line grow pod and a second amount of fluid to the second location within the assembly line grow pod in accordance with the one or more unique fluid requirements for each of the first location and the second location, the one or more pumps communicatively coupled to the pump control module, and transmit an instruction to the one or more pumps, the instruction directing the operation of the one or more pumps in the assembly line grow pod to supply the first amount of fluid to the first location and the second amount of fluid to the second location.

19. The pump control module of claim 18, further comprising an I/O port communicatively coupled to the processing device, the I/O port arranged within a bay I/O port of a bay of a master controller in the assembly line grow pod, the bay I/O port communicatively coupled to the one or more pumps.

20. The pump control module of claim 18, wherein the one or more programming instructions, when executed, further cause the processing device to:

receive a second input;

determine a second action to be completed based on the second input, wherein the second action comprises providing one or more second instructions or signals for operation of one or more components of the assembly line grow pod;

determine a second control module is available or exists for completing the second action; and direct the second control module to complete the second action.

* * * * *